Nov. 23, 1937.  T. J. BROCK  2,099,952
ILLUMINATING DEVICE
Filed Dec. 4, 1935
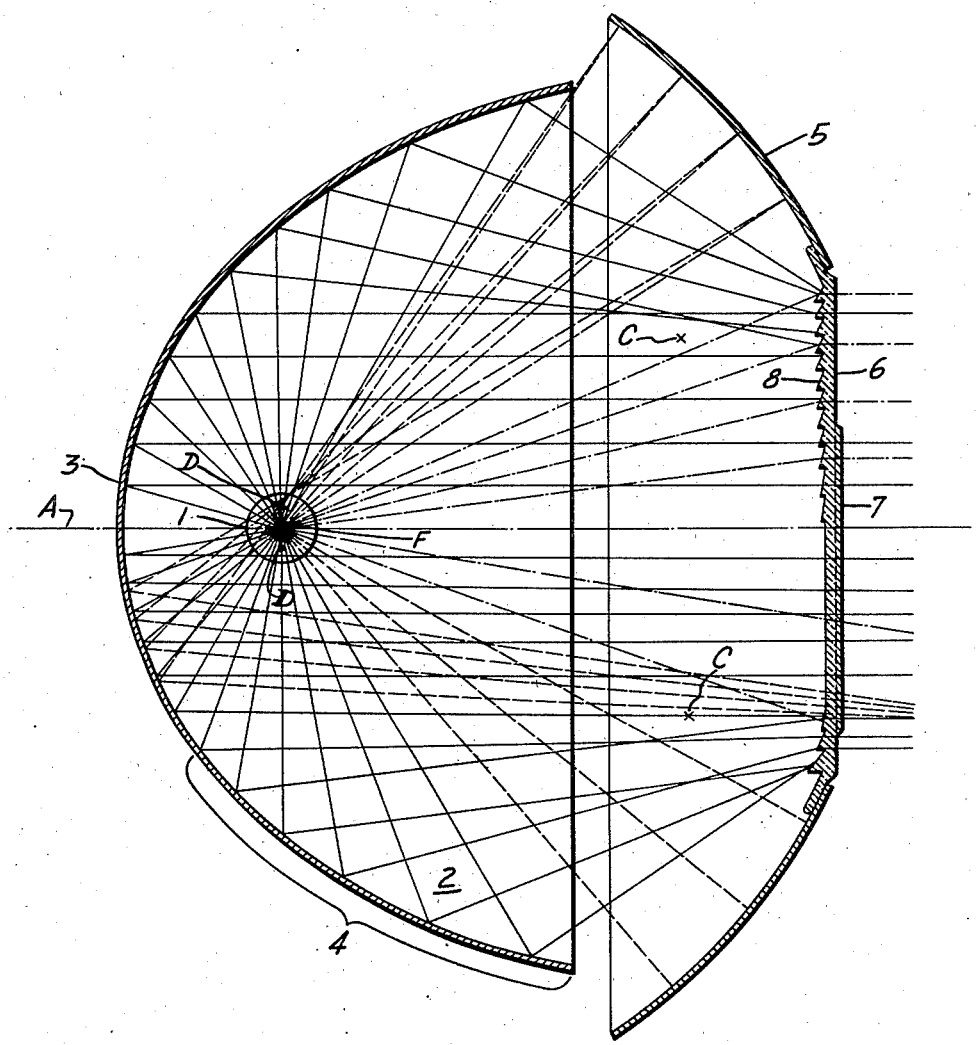
INVENTOR.
Thomas J. Brock
BY
ATTORNEY.

Patented Nov. 23, 1937

2,099,952

UNITED STATES PATENT OFFICE 2,099,952

ILLUMINATING DEVICE

Thomas J. Brock, San Jose, Calif., assignor of thirty percent to Jennie L. Lean, San Jose, Calif.

Application December 4, 1935, Serial No. 52,801

2 Claims. (Cl. 240—41.3)

The present application is a continuation in part of application Serial Number 742,595, filed September 4, 1934.

The present invention relates to illuminating apparatus and more particularly to apparatus for projecting light from a relatively concentrated artificial light source uniformly over a predetermined area, minimizing losses ordinarily incident to such distribution.

Prior art devices of this class are in general found to be designed with the object of avoiding some particular objectionable feature of such devices, and usually do not take into consideration other equally important characteristics necessary in an efficient illuminating device. Thus, for instance, in eliminating glare, certain prior art devices have been so designed as to markedly diminish their total efficiency.

It is therefore an object of the present invention to provide an illuminating device which will effect uniform dispersion and diffusion of light over a predetermined field without sustaining the light losses suffered in prior distributing devices.

Another object of the invention is the elimination of glare without diminishing the amount of light emanating from the device.

Another object of the invention is the provision of means whereby both the forward and lateral illuminated field may be extended.

A still further and more specific object of the invention is the provision of light distributing means which will minimize strains in the lens due to heating.

The foregoing objects and others ancillary thereto which will appear in the following description are accomplished, preferably, by the provision of a plurality of reflector areas cooperating with an artificial light source to effect distribution of the light from said source over a plurality of individual but more or less overlapping areas. More specifically, the several reflector areas are so proportioned to the source as to render the field illumination substantially uniform, and are so arranged with respect to the source as to reflect all light emanating from the said source (other than that passing directly from the source through the lens) out upon the field, with the exception of the small amount absorbed adjacent the usual mounting of the source. If desired, a specially designed lens may be used for diffusion of light so as to obliterate any demarcation between the field areas served by the several reflector areas, or to "trim" the illuminating field in any desired manner.

The novel features characteristic of the invention are set forth with particularity in the appended claims. The invention, however, both as to its organization and operation, together with additional objects and advantages thereof, will be best understood from the following description of a specific embodiment when read with reference to the accompanying drawing forming a part hereof, which illustrates the optical relation of the elements, in a vertical section.

In the illustrated embodiment of the invention, a light source 1 (such as an incandescent lamp of suitable type and candle power), is arranged at the focus F of a parabolic portion 3 of the posterior reflector 2, comprising said parabolic portion 3 and a specially formed marginal portion 4.

The surface of this marginal portion 4 may be geometrically described as a portion of the surface of a tore generated by revolution upon the major axis A of the parabolic portion 3, of a conic section, preferably approximating a circle, having its center situated in the neighborhood of C; a line connecting the surface with such center intersecting the axis of revolution A.

This curvature of the marginal portion 4 is such that rays diverging from the major axis A will be directed, as indicated on the drawing, to illuminate the field to each side of that illuminated by the beam reflected from the parabolic surface 3.

To the other side of the source 1 is an annular anterior reflector 5, the surface of which may be geometrically described as a portion of the surface of a tore generated by revolution upon the aforesaid major axis A of a conic section, preferably approximating a circle, having its center situated in the neighborhood of D; a line connecting the surface with such center lying wholly on one side of the axis of revolution A.

This curvature of the anterior reflector 5 is such that, as indicated on the drawing, rays reflected thereby will not pass back through the source of light 1, and will therefore strike the parabolic portion 3 at an angle differing from the angle of impingement of rays direct from the source 1. This difference of the angle of impingement causes these rays to be reflected at an angle diverging from the major axis A but at a lesser angle than the rays reflected from the marginal portion 4 of reflector 2, and therefore adapted for illumination of the side field more distant from the source 1 than the side field illuminated by reflection from portion 4.

The distribution of the light by these several means may be visualized by considering the pattern they would make upon a vertical screen directly in front of the device. On such a screen, there would appear a central bright spot caused by rays reflected from the parabolic portion 3 of reflector 2, a first ring of light, concentric with the spot, and caused by light reflected from the anterior reflector 5, and a second ring of light outside of the first but concentric therewith, and caused by light reflected from the marginal portion 4 of reflector 2. Light passing directly forward from the source would, of course, spread over the entire field.

Lens 6, provided with diffusing vanes 7, is illustrated as an example of a lens which may be used to effect obliteration of any demarcation between the field areas illuminated in these ways and this lens is also provided with prismatic ribs 8, of special design, for deflecting para-axial rays into a path divergent with respect to the axis and deflecting divergent rays into a para-axial path to effect the desirable equal illumination of all parts of a given field. For instance, where the light is directed downwardly at a slight angle to illuminate a long field, it is necessary to make the upper part of the para-axial beam more intense than the lower part in order to secure more equal illumination of the near and distant portions of the field. (Such redistribution of the light may be conveniently effected by means of a lens individually designed for specific uses.)

It will be noted that the proportion and arrangement of the parts shown is such that approximately 45% of the light rays illuminating the field are reflected from the parabolic portion 3 of reflector 2 and are therefore in the form of a para-axial far-reaching beam, while about 55% are directed by other means into divergent rays for illuminating the field to the sides of the portion illuminated by said first beam. Considering the relative extent of the areas served in these two ways, this division of the light from the source is approximately such as will produce an even illumination of all parts of the field.

This evenness of distribution results in a marked diminution of the objectional feature commonly found in lights and called "glare". It is not the absolute intensity of illumination that gives rise to this glare as the observer looks toward the source of illumination, but the contrast between a very brilliantly emanating spot (usually in the center of the light), and surrounding areas within the field of vision which are much less brilliantly illuminated or else substantially dark. The ocular effect is to produce bleaching of the retinal visual purple to an extent which reduces the sensitivity of the retina to perception of details of lower luminosity, leaving the eye substantially blind as to the much greater field area which is less bright.

As the observer looks toward a light embodying the present invention, however, his eye is not subjected to such a contrast, for the light emanating from the source 1 is spread throughout the entire area of the lens 6, and furthermore, the larger percentage of said light passes out at a divergent angle so that it does not strike the eye directly. The effective intensity of the light, as regards an individual observer, therefore, is that of a light of less than half the real intensity, while the field is illuminated in accordance with the actual intensity and therefore offers much less contrast to the eye.

It will also be noted that, as shown by the lines drawn to show the path of various rays from the source 1, the maximum concentration of light at the point where it passes through the lens 6 is attained in the peripheral portions of the lens disc rather than adjacent its center. This not only distributes the heating effect on the lens over a larger area thereof, but effects the maximum heating adjacent the edge of the disc, whence heat may be most readily passed off by radiation, and conduction to supporting members. This arrangement also reduces expansion strains in the glass disc, which might be destructive if induced adjacent its center under confinement of a comparatively cool peripheral portion, but which may be readily dissipated by expansion when the maximum heating occurs in said peripheral portion.

It will also be apparent that the arrangement of the reflecting surfaces is such that it is not necessary to refract any rays through a great angle in order to secure uniform distribution of light over the illuminated field, the reflectors alone being so arranged as to perform this function with relatively little aid from the lens, so that the latter acts chiefly to smooth out any irregularities of illumination which may arise. Since substantial percentages of light are lost in refraction through large angles, the present invention contemplates the elimination of such losses.

Although a specific embodiment of the invention has been described herein, it will be apparent to persons skilled in the art to which it appertains that many modifications thereof are possible. The invention, therefore, is not to be considered as restricted except in so far as is necessitated by the prior art and by the spirit of the appended claims.

I claim:

1. In an illuminating device, a source of light, reflecting means associated therewith comprising a parabolic surface having said source at its focus, a curved surface adjacent said parabolic surface, generated by revolving an arc of a circle about the axis of the parabolic surface and having a radius intersecting said axis, and an annular reflector for directing light from said source against said parabolic surface at such an angle as to produce rays divergent from the para-axial beam produced by said parabolic surface from light reaching it directly from said source, said annular reflector being a toric surface the radius of which does not intersect the axis of said para-axial beam.

2. In an illuminating device, a source of light, reflecting means associated therewith comprising a parabolic surface having said source at its focus, a curved surface adjacent said parabolic surface generated by revolving an arc of a circle about the axis of the parabolic surface and having a radius intersecting said axis, an annular reflector for directing light from said source against said parabolic surface at such an angle as to produce rays divergent from the para-axial beam produced by said parabolic surface from light reaching it directly from said source, said annular reflector being a toric surface the radius of which does not intersect the axis of said para-axial beam, and a lens comprising horizontal, light deflecting prisms from the top to adjacent the center thereof, and vertical, refracting flutes from adjacent the center to adjacent the bottom thereof.

THOMAS J. BROCK.